US011029822B2

(12) United States Patent
Fang et al.

(10) Patent No.: US 11,029,822 B2
(45) Date of Patent: Jun. 8, 2021

(54) DATA TRANSMISSION METHOD, DEVICE AND MOBILE TERMINAL

(71) Applicant: Beijing Bytedance Network Technology Co., Ltd., Beijing (CN)

(72) Inventors: Chi Fang, Beijing (CN); Wei Lu, Beijing (CN); Yi Li, Beijing (CN); Yumeng Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/022,001

(22) Filed: Sep. 15, 2020

(65) Prior Publication Data
US 2020/0409516 A1 Dec. 31, 2020

Related U.S. Application Data

(63) Continuation of application No. PCT/CN2019/087862, filed on May 21, 2019.

(30) Foreign Application Priority Data

Jun. 19, 2018 (CN) .......................... 201810631374.1
Jun. 19, 2018 (CN) .......................... 201810631375.6

(51) Int. Cl.
*G06F 3/0482* (2013.01)
*H04M 1/724* (2021.01)
(Continued)

(52) U.S. Cl.
CPC .......... *G06F 3/0482* (2013.01); *G06F 3/0346* (2013.01); *G06F 3/04886* (2013.01);
(Continued)

(58) Field of Classification Search
CPC ...... G06F 3/042; G06F 3/034; G06F 3/04886; G06F 9/543; G06T 7/20; H04M 1/72519
(Continued)

(56) References Cited

U.S. PATENT DOCUMENTS

2009/0325647 A1* 12/2009 Cho .................. H04M 1/72519
455/567
2010/0001967 A1* 1/2010 Yoo ..................... G06F 3/04842
345/173
(Continued)

FOREIGN PATENT DOCUMENTS

CN 102662586 A 9/2012
CN 105094567 A 11/2015
(Continued)

OTHER PUBLICATIONS

International Patent Application No. PCT/CN2019/087862; Int'l Search Report; dated Aug. 8, 2019; 2 pages.

*Primary Examiner* — William D Titcomb
(74) *Attorney, Agent, or Firm* — Baker Hostetler

(57) ABSTRACT

A method, a device and a mobile terminal for data transmission are provided. The transmission method is applied in the mobile terminal, when a user wants to share data, target data can be determined in a present application by the mobile terminal, then the mobile terminal is moved to obtain a moving direction and a moving displacement when the mobile terminal moves; an application currently corresponding to the screen of the mobile terminal is determined according to the moving direction, the moving displacement and an initial position of each application; when a predetermined condition is satisfied, an application corresponding to the screen of the mobile terminal is determined to be a target application, and the determined target data are transmitted to the target application; it only needs to move the mobile terminal to determine the target application when a predetermined condition is met for transmitting data to the target application.

18 Claims, 6 Drawing Sheets

(51) Int. Cl.
*G06F 3/0346* (2013.01)
*G06F 3/0488* (2013.01)
*G06F 9/54* (2006.01)
*G06T 7/20* (2017.01)

(52) U.S. Cl.
CPC ............... *G06F 9/543* (2013.01); *G06T 7/20* (2013.01); *H04M 1/724* (2021.01)

(58) Field of Classification Search
USPC .......................................................... 715/810
See application file for complete search history.

(56) References Cited

U.S. PATENT DOCUMENTS

| | | | |
|---|---|---|---|
| 2010/0283729 A1 | 11/2010 | Sung et al. | |
| 2014/0195953 A1* | 7/2014 | Sakai | G06F 3/0485 715/771 |
| 2016/0117076 A1* | 4/2016 | Kim | H04M 1/72519 715/735 |
| 2016/0364107 A1* | 12/2016 | Yim | G06F 3/04883 |
| 2017/0064071 A1* | 3/2017 | Won | G06F 3/0416 |
| 2017/0199570 A1* | 7/2017 | Kwon | H04M 1/72519 |
| 2017/0228748 A1* | 8/2017 | Shibayama | G06Q 10/00 |
| 2017/0344329 A1* | 11/2017 | Oh | H04W 88/02 |
| 2018/0027357 A1* | 1/2018 | Kwon | H04M 1/7253 709/229 |
| 2018/0109729 A1* | 4/2018 | Jang | H04N 5/23293 |
| 2018/0364808 A1* | 12/2018 | Pahud | G06F 3/017 |

FOREIGN PATENT DOCUMENTS

| | | |
|---|---|---|
| CN | 106603846 A | 4/2017 |
| CN | 109743438 A | 5/2019 |
| CN | 109753212 A | 5/2019 |

* cited by examiner

DATA TRANSMISSION METHOD, DEVICE AND MOBILE TERMINAL

CROSS-REFERENCE TO RELATED APPLICATION

The disclosure is a continuation application of International Application No. PCT/CN2019/087862, filed on May 21, 2019, which claims the priority benefit of CN applications Ser. No. 201810631374.1 and No. 201810631375.6, both filed on Jun. 19, 2018. The entirety of the above-mentioned patent applications will be hereby incorporated by reference herein and made a part of this specification.

TECHNICAL FIELD

The disclosure relates to an electronic device technical field, and more particularly to a data transmission method, device and mobile terminal.

DESCRIPTION OF RELATED ART

When using a mobile terminal, a user frequently faces the requirement of sending data in an application to another application, such as the requirement of sending a Word file locally stored in the mobile terminal to a social media, or selecting an image from a gallery application, sharing the image to Moments of a social networking services application to achieve skipping from the gallery application to the social networking services application.

However, in the prior art, the process is complex.

SUMMARY

Accordingly, the disclosure provides a file transmission method, which is unnecessary for the user to operate for multiple times and results in simplifying the transmission process, improving the transmission efficiency and upgrading the user experience.

In order to solve the forgoing technical problem, the disclosure adopts following the following scheme.

One aspect of the disclosure provides a data transmission method. The method is applied in a mobile terminal; the mobile terminal includes applications and target data. The method includes determining the target data to be transmitted; obtaining a moving direction when the mobile terminal moves and obtaining a moving displacement when the mobile terminal moves; determining an application corresponding to a screen of the mobile terminal according to the moving direction, the moving displacement and initial positions of the applications; and when a predetermined condition is satisfied, determining the application corresponding to the screen of the mobile terminal as a target application, and transmitting the target data to the target application.

The initial positions of the applications are original positions of the applications before the mobile terminal moves.

Another aspect of the disclosure provides a data transmission device, applied in a mobile terminal; the mobile terminal includes applications and target data. The device includes a first determining unit configured for determining target data to be transmitted; an obtaining unit configured for obtaining a moving direction and a moving displacement when the mobile terminal moves; a second determining unit configured for determining an application corresponding to the mobile terminal according to the moving direction, the moving displacement and initial positions of the applications; and a transmitting unit configured for determining the application corresponding to a screen of the mobile terminal as a target application and transmitting the target data to the target application when a predetermined condition is satisfied.

The initial positions of the applications are original positions of the applications before the mobile terminal moves.

Another aspect of the disclosure provides a mobile terminal, including at least one memory and at least one processor.

The at least one memory is configured for storing a program code, and the at least one processor is configured for calling the program code stored in the at least one memory to perform any one of the forgoing data transmission methods.

Another aspect of the disclosure provides a storage medium. The storage medium is configured for storing a program code, and the program code is configured for performing any one of the forgoing data transmission methods.

Another aspect of the disclosure provides a computer program product containing an instruction, run by a computer to enable the computer to perform any one of the forgoing data transmission methods.

Another aspect of the disclosure provides a file transmission method. The method is applied in a mobile terminal; the mobile terminal includes applications and target data. The method includes determining the target data to be transmitted; obtaining a moving direction when the mobile terminal moves and obtaining a moving displacement when the mobile terminal moves; determining an application corresponding to a screen of the mobile terminal according to the moving direction, the moving displacement and initial positions of the applications; and when a predetermined condition is satisfied, determining the application corresponding to the screen of the mobile terminal as a target application, and transmitting the target data to the target application.

The initial positions of the applications are original positions of the applications before the mobile terminal moves.

Another aspect of the disclosure provides a file transmission device, applied in a mobile terminal; the mobile terminal includes applications and target data. The device includes a first determining unit configured for determining target data to be transmitted; an obtaining unit configured for obtaining a moving direction and a moving displacement when the mobile terminal moves; a second determining unit configured for determining an application corresponding to the mobile terminal according to the moving direction, the moving displacement and initial positions of the applications; and a transmitting unit configured for determining the application corresponding to a screen of the mobile terminal as a target application and transmitting the target data to the target application when a predetermined condition is satisfied.

The initial positions of the applications are original positions of the applications before the mobile terminal moves.

Another aspect of the disclosure provides a mobile terminal, including at least one memory and at least one processor.

The at least one memory is configured for storing a program code, and the at least one processor is configured for calling the program code stored in the at least one memory to perform any one of the forgoing file transmission methods.

Another aspect of the disclosure provides a storage medium. The storage medium is configured for storing a program code, and the program code is configured for performing any one of the forgoing file transmission methods.

Another aspect of the disclosure provides a computer program product containing an instruction, run by a computer to enable the computer to perform any one of the forgoing file transmission methods.

Another aspect of the disclosure provides a method of sending multimedia information, including determining target multimedia information in a target multimedia application; obtaining a moving direction, a moving displacement of the mobile terminal and position coordinate of each application; determining a target application corresponding to a screen of the mobile terminal according to the moving direction, the moving displacement and position coordinates of the applications; when a predetermined condition is satisfied, transmitting the target multimedia information to the target application.

The position coordinate of each application is the position coordinate of the application corresponding to the mobile terminal.

Another aspect of the disclosure provides a device of sending multimedia information, including a first determining unit configured for determining target multimedia information in a target multimedia application, an obtaining unit configured for obtaining a moving direction, a moving displacement of the mobile terminal and position coordinate of each application, a second determining unit configured for determining a target application corresponding to a screen of the mobile terminal according to the moving direction, the moving displacement and position coordinates of the applications, and a sending unit configured for sending the target multimedia information to the target application if a predetermined condition is satisfied.

The position coordinate of each application is the position coordinate of the application corresponding to the mobile terminal.

Another aspect of the disclosure provides a mobile terminal, including at least one memory and at least one processor.

The at least one memory is configured for storing a program code, and the at least one processor is configured for calling the program code stored in the at least one memory to perform any one of the forgoing methods of sending multimedia information.

Another aspect of the disclosure provides a storage medium. The storage medium is configured for storing a program code, and the program code is configured for performing any one of the forgoing methods of sending multimedia information.

Another aspect of the disclosure provides a computer program product containing an instruction, run by a computer to enable the computer to perform any one of the forgoing methods of sending multimedia information.

Compared to the prior art, the disclosure has following beneficial effects.

The file transmission method, device and mobile terminal provided by the disclosure can be applied in a mobile terminal. The mobile terminal includes applications and target data. When the user wants to share some file, the user can determine the target file in the present application by the mobile terminal; then the user moves the mobile terminal to obtain the moving direction and the moving displacement when the mobile terminal moves. The application currently corresponding to the screen of the mobile terminal is determined according to the moving direction, the moving displacement and initial positons of applications. When the predetermined condition is satisfied, the application corresponding to the screen of the mobile terminal is determined as the target application, and the determined target file is transferred to the target application for outputting the file. According to the file transmission method provided in the disclosure, when a file needs to be transferred, it is unnecessary for the user to select for multi-times and switch between different applications; it merely needs to move the mobile terminal. When a certain predetermined condition is satisfied, and the target application is determined, the file can be transferred to the target application. The transmission process is simplified to improve transmission efficiency, as well as upgrading the user experience.

BRIEF DESCRIPTION OF THE DRAWINGS

In order to clearly understand concrete embodiments of the disclosure, figures configured for describing the concrete embodiments of the disclosure will be illustrated. Obviously, the figures merely are parts of embodiments of the disclosure, and a person skilled in the art can obtain other figures without further creative labor.

DETAILED DESCRIPTION OF PREFERRED EMBODIMENTS

In order to better clarify and complete the objective, the technical scheme and beneficial effects of the disclosure, concrete embodiments of the disclosure will be further illustrated in detail with reference to drawings therewith. Obviously, described embodiments are merely a part of embodiments of the disclosure rather than all of embodiments. Based on embodiments in the disclosure, all other embodiments obtained by a person skilled in the art without creative labor should be included in the protective scope of the disclosure.

Accordingly, an embodiment of the disclosure provides a file transmission method. When a user wants to share some file, the user can determine a target file in a current application by a mobile terminal, and the user moves the mobile terminal, then obtains a moving direction and a moving displacement of the mobile terminal in move; a target application currently corresponding to a screen of the mobile terminal can be determined according to the moving direction, the moving displacement and an initial position of each application. When a preparatory condition is satisfied, the determined target file will be sent to the target application, which fulfills the output of the file.

Clearly, in the file transmission method provided in the disclosure, selections by the user for multi-times or switches between different applications will be unnecessary. The only necessity is to move the mobile terminal for determining the target application. When a predetermined condition is met, the file can be transmitted to the target application, which can simplify the transmission process and improve the transmission efficiency, as well as enhancing the usage experience of the user. Herein, besides files, diverse multimedia information to be shared described above is applicable, as well as other typed data able to be shared between different applications.

Figure 1:
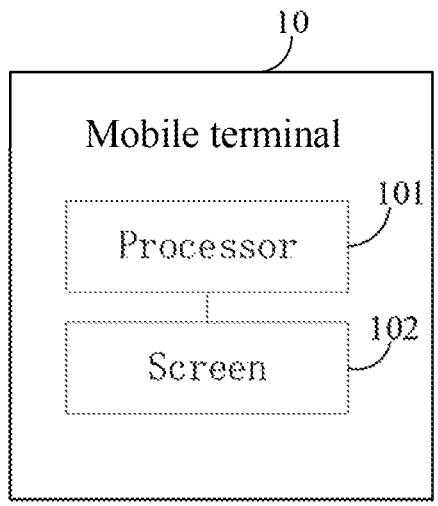
FIG. 1 is a schematic view of an exemplary scene provided by an embodiment of the disclosure.

For instance, one of scenes of the embodiment of the disclosure can be applied in the scene shown in FIG. 1. The method is applied in a mobile terminal 10. The mobile terminal 10 includes a screen 102 and a processor 101. A user selects a target file to be transmitted in an application shown in the screen 102 by the mobile terminal 10. The processor 101 receives the selection operation of the user. Then the user moves with the mobile terminal 10. The processor obtains a moving direction and a moving displacement of the mobile terminal 10, and determines an application corresponding to the moving screen 102 according to the moving direction, the moving displacement and an initial position of each application, and judges if a preparatory condition is satisfied; if the preparatory condition is satisfied, the application corresponding to the screen 102 will be determined to be the target application, and the processor will transmit the received target file to the target application.

It needs to be illustrated that the mobile terminal 10 in embodiments of the disclosure includes but not limited to a mobile device such as a smartphone, a non-smartphone, a tablet, a laptop available, in developing or to be developed.

A person skilled in the art can understand that a schematic frame view shown in FIG. 1 is merely an example to achieve an embodiment of the disclosure. The adaptive scope of the disclosure will be unrestricted to any aspect of the frame.

The file transmission method and device will be illustrated in detail with reference to the embodiments and drawings therewith as follows.

Exemplary Methods

Figure 2:
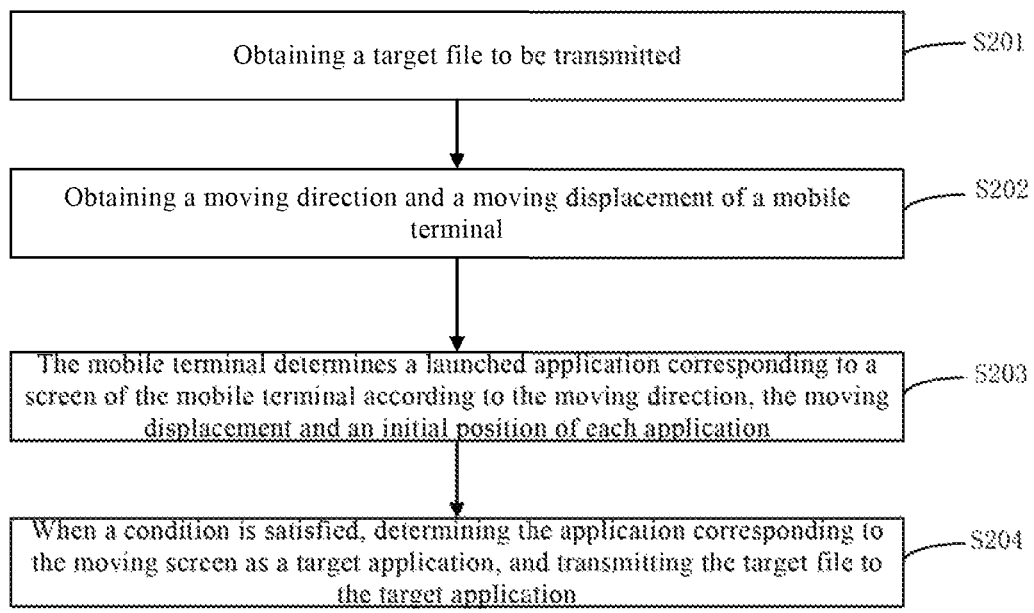
FIG. 2 is a flowchart of a file transmission method provided by an embodiment of the disclosure.

Referring to FIG. 2, FIG. 2 is a flowchart of a file transmission device provided by an embodiment of the disclosure.

The method can be applied in a mobile terminal. The mobile terminal includes numerous applications and a target file. Following steps can be included.

S201, a target file to be transmitted is determined.

In the embodiment, a user utilizes a mobile terminal to determine a target file to be transmitted in a current application. For instance, an application currently shown by a screen of the mobile terminal is a reader application. The user selects a file X It needs to be illustrated that the target file in the embodiment can include a file with literal information, such as a Word file, a PDF file, a TXT file, an Excel file and a PPT file, which can further be a file type including literal information in other forms.

The transmitted data can further be target multimedia information. The multimedia information practically is multimedia information to be shared in a target multimedia application. Common multimedia information includes pictorial information, video information and audio information. Therefore, in the embodiment, the target multimedia information includes at least one of pictorial information, video information and audio information. For instance, in response to an operation that the user selects some picture from a photos interface shown in the mobile terminal, the pictorial information is determined to be the target multimedia information.

Additionally, it needs to clarify that each steps in each method and hardware modules described in detail in the disclosure are fitted for the forgoing files, multimedia information and various types of data able to be shared, which will not be respectively repeated.

S202, a moving direction and a moving displacement of the mobile terminal in the movement are obtained.

In the embodiment, when the user determines a file to be transmitted by the mobile terminal, the user moves with the mobile terminal. The mobile terminal obtains a moving direction and a moving displacement of its own, so as to determine a current position of the mobile terminal according to the moving direction and the moving displacement.

The moving direction can be one or more of an upward move, a downward move, a leftward move, a rightward move, a forward move and a backward move. In practice, the moving direction of a phone carried by the user should be determined by the arrangement of each application. Each application can be arranged according to different rules. For instance, each application can be tiled on the same surface, or on different surfaces. The specific arrangement of each application will be introduced in detail later, which will not be described herein.

With respect to the acquirement of the moving direction, the embodiment of the disclosure provides a possible fulfillment manner, which specifically can be obtaining the moving direction of the mobile terminal according to data sent from a gyro sensor disposed in the mobile terminal. In the practical application, when a position of the mobile terminal changes, the gyro sensor will detect a direction of the mobile terminal, and send the detected data to a controller of the mobile terminal, so as to enable the controller to be able to obtain the moving direction of the mobile terminal according to received data.

Regarding the acquirement of the moving displacement, the embodiment of the disclosure provides two achievement manners, and the two manners of obtaining the moving displacement will be respectively introduced as below.

The first possible achievement manner is obtaining a moving acceleration and moving time according to data sent from an acceleration sensor disposed in the mobile terminal; and integrating the moving acceleration and the moving time to obtain the moving displacement.

In the embodiment, the mobile terminal obtains the acceleration and time in the movement according to the acceleration sensor disposed therein, and calculates the integral for the acceleration and the time to obtain the displacement of the mobile terminal. The acceleration sensor can detect the acceleration of the mobile terminal in the movement and the time in the movement. The acceleration sensor sends the detected data to the controller of the mobile terminal, and the controller calculates the integral for the received data to obtain the displacement of the mobile terminal.

A second possible achievement manner is obtaining ambient images in the movement of the mobile terminal; obtaining a distance between each two adjacent frames of pictures of the ambient images; and adding up distances between any two adjacent frames of pictures to obtain the moving displacement.

Comprehensibly, when the user moves with the mobile terminal, pictures shot by a camera include different ambient conditions. Therefore, the moving displacement of the mobile terminal when the camera shot the two frames of pictures can be obtained according to the positional alteration of an object in two adjacent frames of pictures; then the displacement of each of the two adjacent frames of pictures will be summed up to obtain a total displacement, which is the moving displacement.

For the sake of comprehension, for instance, when the user moves with the mobile terminal, the camera can record a 5-second video, which is formed by frames of pictures shot in a frequency of 50 frames per second. Therefore, the video includes 250 frames of pictures. Then the moving distance of the camera can be determined according to the positional alteration of a reference substance in each of two adjacent frames of pictures; so and so forth, all the moving distances will be summed up to obtain the moving displacement of the mobile terminal.

It needs to clarify that the moving distance of the camera needs to be determined based on the positional alteration of the reference substance in pictures when a camera equipped with the mobile terminal is utilized to obtain the moving displacement. When the acceleration of the mobile terminal in the movement is relatively high, the shot pictures may be blurred, which can lead to the determined moving distance of the camera to be incorrect. Therefore, before the moving displacement of the mobile terminal is obtained, the acceleration of the mobile terminal can be judged in advance, and the manner of obtaining the moving displacement can be determined.

In practice, the acceleration of the mobile terminal is obtained. When the acceleration is lower than or equal to a predetermined acceleration threshold, it indicates the mobile terminal moves slowly and smoothly, and the second manner can be selected. The moving displacement of the mobile terminal is obtained by processing pictures; when the acceleration is larger than the acceleration threshold, the first manner is selected. The moving displacement is obtained by integrating the acceleration and the time.

Therefore, in some embodiments of the disclosure, the moving displacement of the mobile terminal in the second achievement manner can be obtained by following steps.

Step a, ambient images of the mobile terminal in the movement are obtained by the camera equipped with the mobile terminal.

Step b, a distance between any two adjacent frames of pictures of the ambient images is obtained.

Step c, the distance between any two adjacent frames of pictures of the ambient images is added up to obtain the moving displacement of the mobile terminal.

For instance, the time for the mobile terminal to move is 3 seconds. The camera obtains ambient images of the mobile terminal in the movement. The camera is supposed to shoot pictures in a frequency of 30 frames per second, and 90 frames of ambient images will be obtained when the mobile terminal moves 3 seconds. The distance of the mobile terminal in the movement can be determined based on the positional alteration of the reference substance in each two adjacent frames of pictures during shooting the two frames of pictures. The distance between any two adjacent frames of 90 frames of ambient images is added up to obtain the moving displacement of the mobile terminal in 3 seconds.

It further needs to be illustrated that the manner of obtaining the moving displacement of the mobile terminal based on data of the acceleration sensor is preferred to be applied in a scene that the mobile terminal moves relatively fast. The manner of calculating integral for the acceleration and the time to obtain the moving displacement is preferred in the scene. Obtaining the moving displacement of the mobile terminal based on ambient images shot by the camera is a better choice in a scene that the mobile terminal moves relatively slow and smooth; the moving displacement obtained by processing pictures in the scene is relatively high in accuracy. Furthermore, the two manners can be combined to obtain the moving displacement with the higher accuracy.

S203, a target application corresponding to a screen of the mobile terminal is determined according to the moving direction, the moving displacement and an initial position of each application.

The initial position of each application indicates an initial position of each application before the mobile terminal moves. The position is a position corresponding to the mobile terminal. In practice, a coordinate system can be built with the mobile terminal as an origin of the coordinate to obtain a positional coordinate of each application.

In the embodiment, when the mobile terminal is regarded as the origin of the coordinate, a position of the mobile terminal after the movement can be determined according to the moving direction and the moving displacement, and then the application corresponding to the screen where the mobile terminal currently is located according to the initial position of each application.

Herein, the position coordinate of each application indicates a position coordinate of each application corresponding to the mobile terminal.

Intelligible, after determining the target file, it needs to clarify which application the target file will be sent to. In order to solve a problem of a complicated operation with multi-choices in the prior art, specifically, the user moves the mobile terminal to switch the screen display from the application with the target file to another application, and the user can determine one application to be the target application to receive the target file to be shared. In order to be able to determine the application displayed by the mobile terminal after the movement, it is required to obtain the moving direction and the moving displacement of the mobile terminal, as well as a position coordinate of each application.

The applications are tiled on a virtual surface. The applications include other applications and the application with the target file. When the user moves the mobile terminal, the movement can be upward (downward, leftward, rightward, forward or backward), accordingly the screen of the mobile terminal displays other applications above (below, on the left/right side, in the front/rear of) the application with the target file on the virtual surface. Therefore, in some embodiments of the disclosure, the moving direction includes at least one of the upward movement, the downward movement, the leftward movement, the rightward movement, the forward movement and the backward movement.

It needs to be clarified that the position coordinate of each application indicates a position coordinate corresponding to the mobile terminal before the movement, which can be regarded as building a coordinate system with a center of the mobile terminal. A position coordinate of each application in the coordinate system is determined to be the position coordinates corresponding to the mobile terminal, namely the position coordinate of each application.

As each application tiled on the virtual surface subjects to a certain predetermined arrangement rule; in other words, each application is arranged according to a predetermined arrangement rule, which can be referred to subsequent embodiments, and the position coordinate of each application can be obtained based on the predetermined arrangement rule.

Conceivably, after obtaining the moving direction, the moving displacement and the position coordinate of each application of the mobile terminal, in a condition of knowing the position coordinate corresponding to each application of the mobile terminal before the movement, if the moving direction and the moving displacement of the mobile terminal can be determined, the application corresponding to the mobile terminal after the movement can be obtained from the other applications; in other words, the target application displayed by the screen of the mobile terminal after the movement can be determined.

S204, when a predetermined condition is satisfied, an application corresponding to the screen of the mobile terminal is determined to be the target application, and the target file is transmitted to the target application.

In the embodiment, when the predetermined condition is satisfied, the mobile terminal determines a target application currently corresponding to the screen as the target application, and transmits the selected target file to the target application.

It needs to be illustrated that as the movement of the mobile terminal in actual is approaching other applications of each of the applications, after determining the target application in the step S203, if a positional distance between the mobile terminal after the movement and the target application is short enough, namely satisfying a predetermined condition that the positional distance is shorter than the predetermined distance, the purpose of the movement operated by the user can be deemed to transmit the target file to the target application. Therefore, after the step S203, the positional distance between the mobile terminal and the target application can be obtained; the positional distance then can be compared with the predetermined distance to determine whether to trigger the operation of transmitting target multimedia information or not.

There can be numerous forms to determine the target application, which will be respectively introduced as follows.

Figure 3:
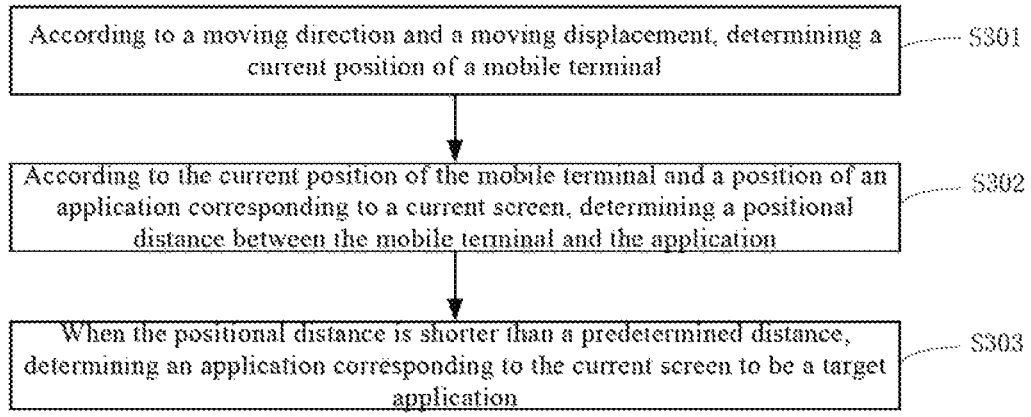
FIG. 3 is a flowchart of determining a target application in step S204 according to an embodiment of the disclosure.

A first possible form is to judge whether to transmit the target file or not according to a distance between a position of the mobile terminal after the movement and the position of each application, as shown in FIG. 3, which can specifically include following steps.

S301, a current position of the mobile terminal is determined according to the moving direction and the moving displacement.

In the embodiment, when a position of the mobile terminal before the movement is regarded as an origin of coordinates, a current position of the mobile terminal can be determined according to the moving direction and the moving displacement. When a position of the mobile terminal before the movement is not regarded as an origin of coordinates, it needs to obtain the position of the mobile terminal before the movement; then the current position of the mobile terminal can be determined according to the moving direction and the moving displacement.

It needs to be clarified that when the mobile terminal and the each application are on the same surface, the current position of the mobile terminal can be determined by a two-dimensional coordinate. For instance, an initial position of the mobile terminal is (0, 0); the moving direction is upward; the moving displacement is 0.1 m; accordingly, the current position of the mobile terminal is (0, 0.1). If the mobile terminal and each application are on different surfaces, the current position of the mobile terminal can be determined by a three-dimensional coordinate. For instance, an initial position of the mobile terminal is (0, 0, 0), and the movement is 0.1 in an upward direction and 0.2 in a positive direction along the Z axis; accordingly, the current position of the mobile terminal is (0, 0.1, 0.2).

Step 302, a positional distance between the mobile terminal and the target application according to the current position of the mobile terminal and the position of the target application.

In the embodiment, when the current position during the movement and the position of the target application are obtained, a distance between the two positions is calculated. Specifically in practice, the positional distance is calculated according to coordinate information of the two positions.

The positional distance between the mobile terminal and the target application depicts a distance between the position of the mobile terminal after the movement and the position of the target application, and a specific calculation is utilizing a distance formula and obtaining according to positional coordinates of two positions. A position coordinate of the target application can be obtained in position coordinates of each application; a position coordinate of the mobile terminal after the movement is obtained based on the moving direction and the moving displacement of the mobile terminal. Therefore, in some embodiments of the disclosure, the step S302 can include following steps.

Step a, according to the moving direction and the moving displacement, a current position coordinate of the mobile terminal is obtained.

Step b, according to the current position coordinate of the mobile terminal and the position coordinate of the target application, a positional distance between the mobile terminal and the target application can be obtained.

S303, if the position distance is shorter than a predetermined distance, an application corresponding to the screen of the mobile terminal can be determined as the target application.

In the embodiment, when the positional distance between the mobile terminal and the target application is shorter than a predetermined distance, the application corresponding to the screen during the movement can be determined to be the target application.

The predetermined distance can be pre-disposed, which can be disposed according to the practical situation. Aiming at different mobile terminals, different distance thresholds can be disposed, and the embodiment will not be restricted thereto.

The second form is when the screen of the mobile terminal corresponds to the target application and screen of the mobile terminal is controlled by touch, the application corresponding to the screen is determined as the target application. For instance, when the mobile terminal is moved to some application, if the application is the target application of the desired destination of the user, an instruction can be sent to the mobile terminal by touching the screen for transferring the file.

The third form is when the screen of the mobile terminal corresponds to the target application, and a pre-set button on the screen of the mobile terminal is detected to be touched, the application corresponding to the screen during the movement can be determined as the target application. For instance, when the mobile terminal moves to some position, and the user determines the application corresponding to the current screen in the movement as the target application, a transfer instruction can be sent to the mobile terminal by touching the pre-set button on the screen for transferring the file.

A fourth form is when the screen of the mobile terminal corresponds to the target application, and the mobile terminal is detected to be a constant state within a predetermined period, the application corresponding to the screen in the movement can be determined as the target application. The constant state indicates the moving direction and the moving displacement of the mobile terminal within the period both are unchanged.

Specifically in practice, the mobile terminal can be disposed with a timer for the statistic of display time that the mobile terminal shows the corresponding application. When the display time is longer than the predetermined time, the application displayed by the screen of the mobile terminal can be determined as the target application, and the selected target file is transferred to the target application.

Moreover, it further can obtain the display time for the mobile terminal showing the corresponding application by a camera equipped in the mobile terminal. In practice, the mobile terminal will shoot the external environment during the movement. When the shot view is detected to be unchanged, the timer will be started for timekeeping to determine the display time of the mobile terminal.

Conceivably, the mobile terminal can further adopt other manners to determine the target application, such as in a manner of a specific gesture of the user, or in a manner of an angle for the mobile terminal to rotate, and the embodiment will not be restricted thereto. When one of these conditions is satisfied, the target file can be transferred to the target application.

According to the file transfer method provided in the embodiment of the disclosure, when the user wants to share some file, the user can determine the target file in the present application, and the user moves the mobile terminal to obtain the moving direction and the moving displacement of the mobile terminal in the movement. The application currently corresponding to the screen of the mobile terminal can be determined according to the moving direction, the moving displacement and the initial position of each application. When the predetermined condition is satisfied, the application corresponding to the screen of the mobile terminal can be determined as the target application, and the determined target file can be transferred to the target application to achieve the file output. It can be learnt that according to the file transmission method provided in the disclosure, when a file needs to be transferred, it is unnecessary for the user to select for multi-times and switch between different applications; it merely needs to move the mobile terminal. When a certain predetermined condition is satisfied, as long as the target application is determined, the file can be transferred to the target application. The transmission process is simplified to improve transmission efficiency, as well as upgrading the user experience.

Or according to various embodiments, first, in response to a selection operation of the user, the target multimedia information can be determined in a target multimedia application; second, in response to an operation that the user moves a phone, the moving direction, the moving displacement of the mobile terminal and the position coordinate of each application corresponding to the mobile terminal can be obtained; then according to the moving direction, the moving displacement and the position coordinate of each application, the target application displayed by the screen of the mobile terminal can be determined; last, if a predetermined condition is satisfied, the target multimedia information will be sent to the target application. It can be seen that it is unnecessary to perform multiply selection operations for switching from the multimedia application to another application. After selecting the target multimedia information, the multimedia information in the multimedia application can be directly shared to another application by moving the phone. The entire sharing process is simple and easy. The operation of moving the phone is extremely speedy, which can result in improving the efficiency of sharing multimedia information and upgrading the user experience.

It can be known from the forgoing method embodiments, in performing the method of the disclosure, the arrangement of each application in the mobile terminal needs to be pre-obtained. When it needs to transfer the target file, the user moves with the mobile terminal according to the given arrangement to display the target application on the screen of the mobile terminal. Therefore, in transferring the target file, each application can be arranged, and the method of the disclosure will be illustrated with reference to drawings as follows. Each application in forgoing embodiments actually is pre-arranged on a virtual surface according to the predetermined arrangement rule. Preferably, before determining the target multimedia information, each application has been arranged, in order that the screen can display other application interface when the mobile terminal moves.

Figure 4:
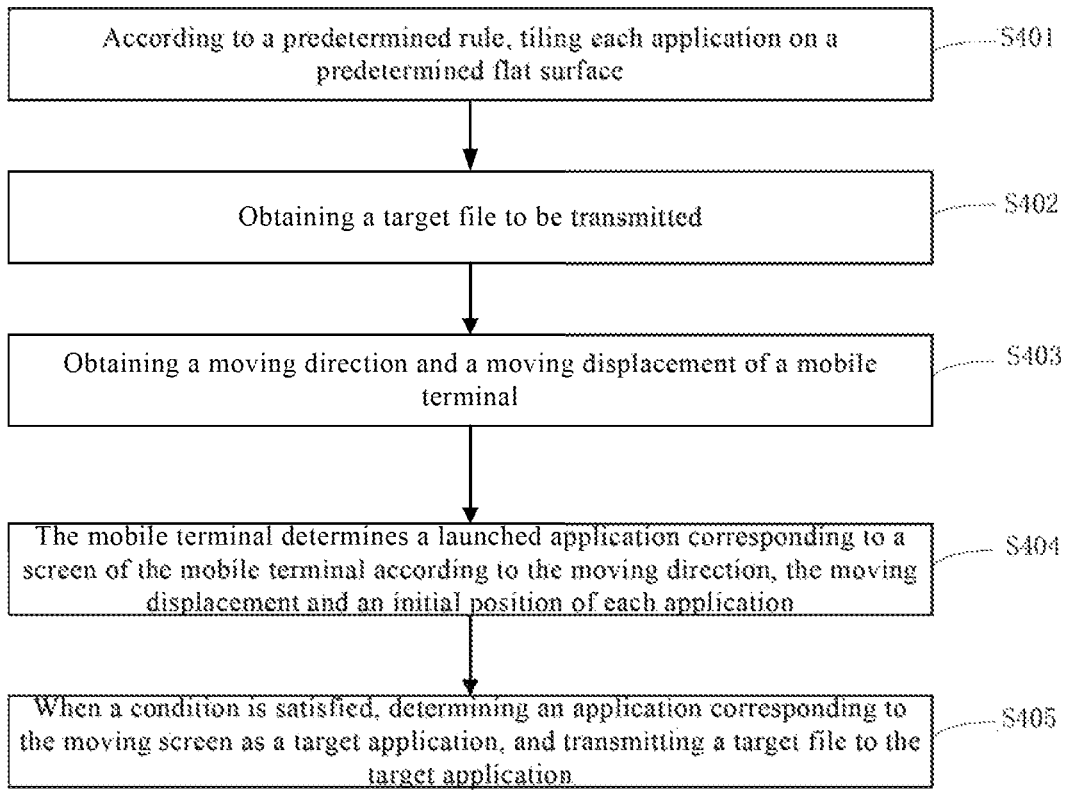
FIG. 4 is a flowchart of another file transmission method provided by an embodiment of the disclosure.

Referring to FIG. 4, the figure is a flowchart of another file transmission method provided by an embodiment of the disclosure.

In the embodiment, the method can include following steps.

S401, according to a predetermined rule, each application is tiled on a pre-set surface for arranging each application.

In the embodiment, according to the arrangement rule, each application in the mobile terminal is tiled on the pre-set surface, so that the user can move the mobile terminal according to the position of each application on the pre-set surface.

Figure 5A:
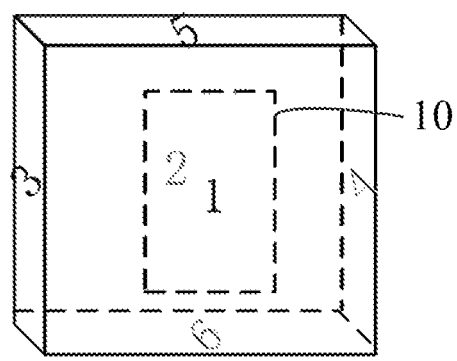
FIG. 5A is a schematic view of a predetermined surface of arrangement provided by an embodiment of the disclosure.

The pre-set surface includes at least one surface of a hexahedron with the mobile terminal as a center; the hexahedron can be a cuboid or a cube. Each application is tiled on the same surface within the pre-set surface. As shown in FIG. 5A, in the cube, six surfaces 1-6 are included; the mobile terminal 10 is located at the center of the hexahedron; the pre-set surface can be any one of the surfaces thereof.

Figure 6A:
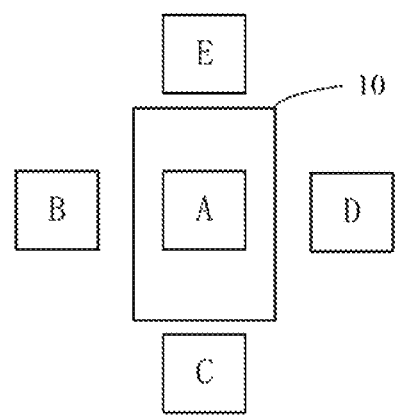
FIG. 6A is a schematic view of an applied arrangement provided by an embodiment of the disclosure.
Figure 6B:
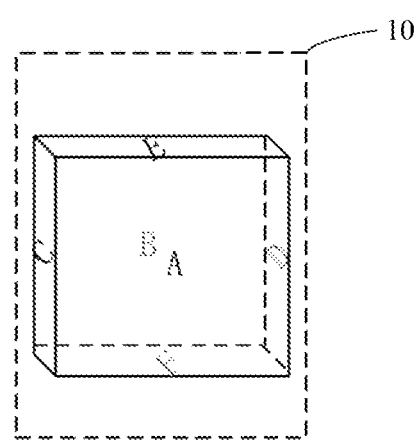
FIG. 6B is a schematic view of an applied arrangement provided by an embodiment of the disclosure.

Taking the surface 1 as an example to illustrate, the arrangement of each application on the surface 1 can be referred to FIG. 6A. The surface is arranged with 5 applications, which respectively are app A, B, C, D and E, and in the figure, the screen of the mobile terminal 10 corresponds to app A. Apparently, each application can further be respectively arranged on six different surfaces, as shown in FIG. 6B, in the figure, app A, B, C, D, E and F respectively are arranged on different surfaces, and the screen of the mobile terminal 10 corresponds to app A.

Figure 6C:
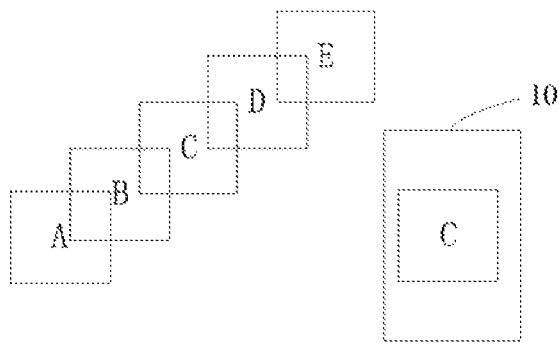
FIG. 6C is a schematic view of an applied arrangement provided by an embodiment of the disclosure.

Apparently, each application can further be tiled on different surfaces, and the surfaces are mutually parallel, as shown in FIG. 6C, in the figure, surfaces where the app A, B, C, D and E are located are mutually parallel, and the screen of the mobile terminal 10 corresponds to app C.

In the embodiment, S402 has the same technical implementation as S202, which can be referred to S202, and will not be repeated herein.

S403, a moving direction and a moving displacement when the mobile terminal moves can be obtained. It further can obtain the position coordinate of each application according to the requirement. The position coordinate of each application indicates the position coordinate of each application corresponding to the mobile terminal.

The moving direction includes six directions that left, right, upward, downward, forward and backward directions; the user can determine the moving direction of the mobile terminal according to the application currently corresponding to the screen of the mobile terminal.

For the sake of comprehension, when each application is arranged as shown in FIG. 6A, it can be supposed that when the screen of the mobile terminal 10 displays the app A, and the user needs to transfer a file of app A to app B, the mobile terminal can be moved to left; when it needs to be transferred to app D, the movement can be rightward; when it needs to be transferred to app E, the movement can be upward; when it needs to be transferred to app C, the movement can be downward.

When each application is arranged as shown in FIG. 6C, it can be supposed that when the screen of the mobile terminal 10 displays the app C, and a file of app C needs to be transferred to app B, the user can moves the mobile terminal forward and subsequently leftward for approaching app B, so that the screen of the mobile terminal corresponds to app B; when it needs to be transferred to app E, the movement is first backward and then leftward for approaching app E, so that the screen of the mobile terminal corresponds to app E.

S404-S405 respectively are identical to S203 and S204, the embodiment will not repeat herein.

Figure 5B:
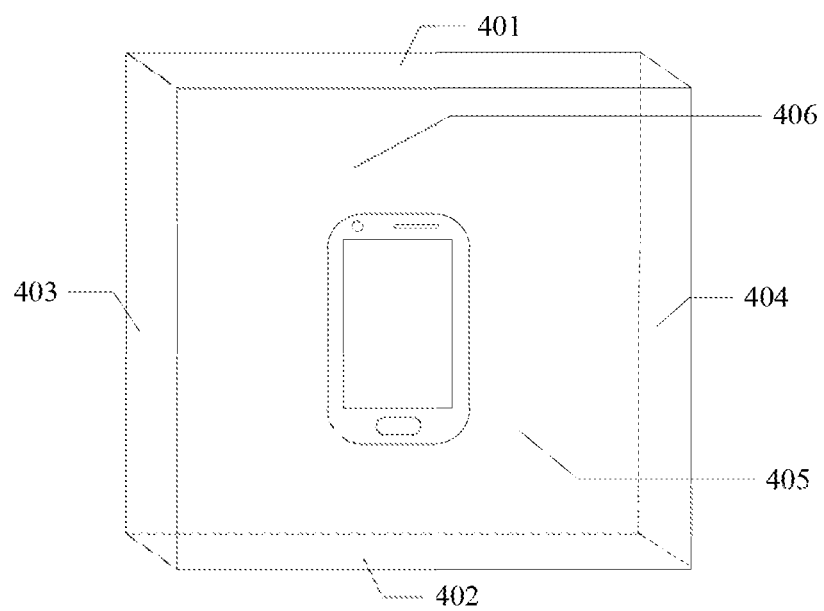
FIG. 5B is a schematic view of a predetermined surface of arrangement provided by an embodiment of the disclosure.

It needs to be illustrated that for the sake of completely showing applications without overlaps, each application generally is arranged to be tiled. It can be supposed that the mobile terminal is a mass point, and the most common surface corresponding to the mass point includes each surface of the hexahedron with the mass point as a center. Therefore, each application can be tiled on any surface or surfaces of the hexahedron based on a pre-given tiling rule. Therefore, in some embodiments of the disclosure, the step S401 specifically can be according to the pre-given tiling rule, each application is tiled on a predetermined surface, and the predetermined surface includes at least one surface of the hexahedron with the mobile terminal as a center. For instance, as a schematic view of a predetermined surface shown in FIG. 5B, a columnar parallelepiped, such as a cube or a cuboid, includes a top surface 401, a bottom surface 402, a left surface 403, a right surface 404, a front surface 405 and a rear surface 406, which are six surfaces, and the predetermined surface can be supposed to be one or more of the six surfaces; the target multimedia application displayed by the mobile terminal before the movement merely is tiled on one surface, and only one surface exists.

It needs to clarify that with respect to any surface of the columnar parallelepiped, such as any surface of the cube or cuboid, the tiling manner of applications can be the same.

For a purpose that a person skilled in the art can better understand the technical scheme provided by the disclosure, the scene shown in FIG. 6A will be taken as an example, in the scene, each application of the mobile terminal 10 is tiled on a virtual surface. The virtual surface and the mobile terminal locate on the same surface. For instance, the screen of the mobile terminal 10 displays app A, and the app A is surrounded by app B, app C, app D and app E; if the mobile terminal is moved upward, the screen will display app E; if the mobile terminal is moved downward, the screen will display app C; if the mobile terminal is moved leftward, the screen will display app B; if the mobile terminal is moved rightward, the screen will display app D. When the user wants to transfer a word file of app A to app B, it first needs to determine the word file in app A, then the mobile terminal 10 is moved leftward to correspond the screen of the mobile terminal 10 to app B; when a predetermined condition is satisfied, and the mobile terminal determines the app B as the target application, the word file will be transferred to app B.

Figure 6D:
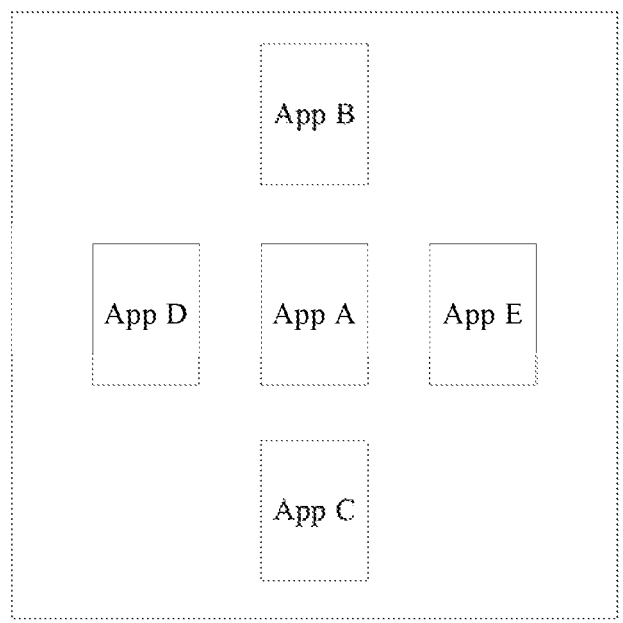
FIG. 6D is a schematic view of an applied arrangement provided by an embodiment of the disclosure.

It needs to illustrate that regarding any surface of the columnar parallelepiped, such as any surface of the cube or cuboid, the tiling manner of applications can be the same. For instance, a schematic view of applications tiled on a virtual surface as shown in FIG. 6D, the target multimedia application displayed by the mobile terminal before the movement is app A; app B is above app A; app C is below app A; app D is on the left side of app A; app E is on the right side of app A. If the mobile terminal is upward moved, the screen will display app B; if the mobile terminal is downward moved, the screen will display app C; if the mobile terminal is leftward moved, the screen will display app D; if the mobile terminal is rightward moved, the screen will display app E.

The virtual surface as shown in FIG. 6D is supposed to be a rear surface of a columnar parallelepiped with the mobile terminal as a center; for instance, the mobile terminal is moved upward, and the screen will display app B. A distance between the mobile terminal and app B is longer than the predetermined distance, which fails to meet the predetermined condition; the mobile terminal is backward moved, and the screen still displays app B, and until the distance between the mobile terminal and the app B is shorter than the predetermined distance, the target multimedia information will be sent to app B. Apparently, after the mobile terminal moves upward and the screen of the mobile terminal displays app B, if the mobile terminal keeps unmoved within a predetermined period, the screen of the mobile terminal is touched or a pre-set button on the screen of the mobile terminal is triggered, it further can send the target multimedia information to app B. The directional movement such as the downward movement, the leftward movement and the rightward movement is similar to the upward movement, which can be obtained by proper deduction, which will not be repeated herein.

The user scanning moments of social networking services by a smartphone and looking forward to sharing an image M in photos to moments of social networking services is taken as an example, after searching the image C from photos, in response to an operation that the user selects the image M in photos interface shown by a screen of the smartphone, the image M is determined as the target multimedia information; each application is supposed to be tiled on a rear surface of a cube with the smartphone as a center based on a predetermined arrangement rule; the rear surface is the virtual surface, which has a vertical distance of 25 mm with the center (smartphone). The social networking services are tiled on the left side of the photos app with a distance of 20 mm therebetween. In response to the operation of the user moving the mobile terminal, the moving direction and the moving displacement, which are moving leftward for 20 mm and moving backward for 20 mm, and the position coordinate of each application can be obtained. According to the moving directions, moving displacement and the position coordinate of each application above, the target application displayed by the screen of the mobile terminal after the movement is determined is determined to be social networking services; a positional distance of 5 mm between the mobile terminal after the movement and social networking services is shorter than a predetermined distance of 8 mm, and the image M will be triggered to be sent to social networking services. The interface of social networking services is moments interface, and the image M in photos app can be transferred to moments of social networking services.

It needs to illustrate the forgoing embodiment is merely the exemplary scene for explanation, which will not limit the disclosure.

Exemplary Devices

Based on the forgoing method embodiments, the disclosure further provides a file transmission device; the device will be illustrated with reference to drawings as follows.

Figure 7:
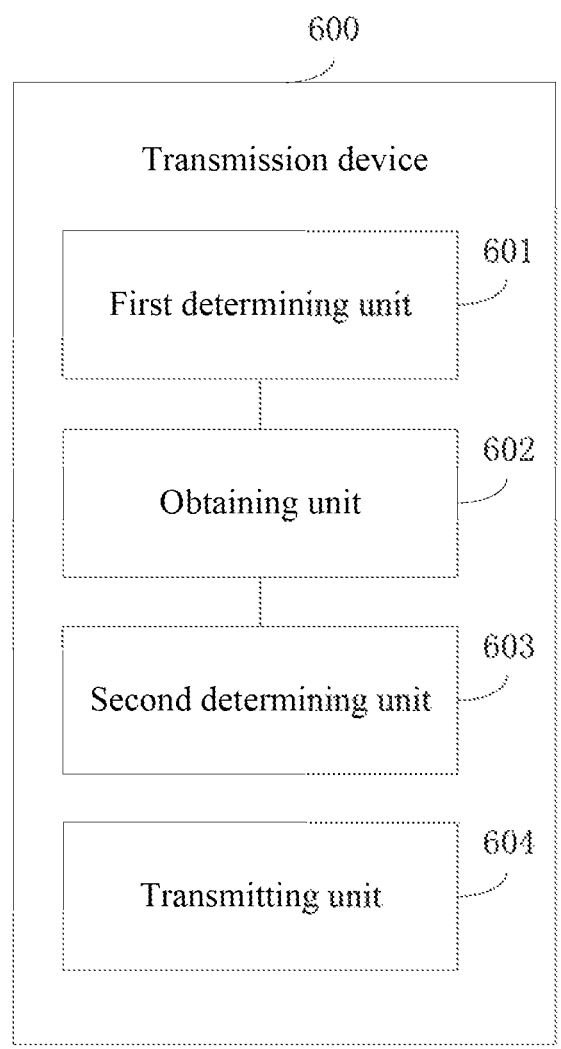
FIG. 7 is a structural view of a file transmission device provided by an embodiment of the disclosure.

Referring to FIG. 7, which is a structural view of a file transmission device provided by an embodiment of the disclosure, the device is applied in a mobile terminal. The mobile terminal includes numerous applications and a target file. The device can include a first determining unit/determiner 601 configured for determining a target file to be transferred, an obtaining unit/obtainer 602 configured for obtaining a moving direction and a moving displacement when the mobile terminal moves and obtaining an initial position of each application, a second determining unit/determiner 603 configured for determining a target application corresponding to the mobile terminal according to the moving direction, the moving displacement and the initial position of each application, and a transmitting unit/transmitter 604 configured for determining an application corresponding to the screen of the mobile terminal as a target application when a predetermined condition is satisfied and transferring the target file to the target application.

The obtaining unit/obtainer 602 can further be named as an acquiring unit/acquirer.

The initial position of each application is an original position of each application before the mobile terminal moves.

The transmitting unit/transmitter 604 can further be named as a transmission triggering unit/trigger, which can trigger to send the target multimedia information to the target application if the predetermined condition is met.

Optionally, in some embodiments, the transmitting unit is configured for determining the current position of the mobile terminal according to the moving direction and the moving displacement.

According to the current position of the mobile terminal and the position of the target application, the positional distance between the mobile terminal and the target application can be obtained, and whether the positional distance is shorter than a predetermined distance is judged; if so, the application corresponding to the screen of the mobile terminal is determined as the target application, and the target file is transferred to the application.

Optionally, in some embodiments, the transmitting unit is configured for transferring the target file to the target application when the screen of the mobile terminal is detected to be touched, or transferring the target file to the target application when a pre-set button on the screen of the mobile terminal is detected to be touched, or transferring the target file to the target application when the mobile terminal is unmoved within a given period.

In some embodiments, the process of obtaining a moving direction when the mobile terminal moves includes according to data sent from a gyroscope sensor disposed in the mobile terminal, obtaining the moving direction when the mobile terminal moves.

In some embodiments, the process of obtaining a moving displacement when the mobile terminal moves includes according to data sent from an accumulation sensor disposed in the mobile terminal, obtaining a moving acceleration and a moving time of the mobile terminal; and integrating the moving acceleration and the moving time to obtain the moving displacement.

In some embodiments, the process of obtaining a moving displacement when the mobile terminal moves includes obtaining ambient images by a camera disposed in the mobile terminal when the mobile terminal moves; obtaining distances between each two adjacent frames of images of the ambient images; and adding up all the distances between each two adjacent frames of images to obtain the moving displacement.

In some embodiments, the device further includes a deploying unit configured for tiling each application on a predetermined surface according to a predetermined rule.

The predetermined surface includes at least one surface of a hexahedron with the mobile terminal as a center.

In some embodiments, the moving direction at least includes one of an upward movement, a downward movement, a leftward movement, a rightward movement, a forward movement and a backward movement.

In some embodiments, the file data include any one of a Word file, a PDF file, a TXT, an Excel file and a PPT file.

It needs to illustrate that specific implementation and disposition of each unit or module provided in the embodiment can be referred to the method embodiment as shown in FIG. 2, which will not be repeated herein.

According to the device provided by the embodiment of the disclosure, when the user wants to share some file, the user can determine the target file in the present application by the mobile terminal; then the user moves the mobile terminal to obtain the moving direction and the moving displacement when the mobile terminal moves. The application currently corresponding to the screen of the mobile terminal is determined according to the moving direction, the moving displacement and initial positons of applications. When the predetermined condition is satisfied, the application corresponding to the screen of the mobile terminal is determined as the target application, and the determined target file is transferred to the target application for outputting the file. According to the file transmission device provided in the disclosure, when a file needs to be transferred, it is unnecessary for the user to select for multi-times and switch between different applications; it merely needs to move the mobile terminal. When a certain predetermined condition is satisfied, and the target application is determined, the file can be transferred to the target application. The transmission process is simplified to improve transmission efficiency, as well as upgrading the user experience.

As described above, the transmitting unit 604 can further be named as a sending trigger, configured for sending the target multimedia information to the target application. Referring to FIG. 7, another embodiment of the disclosure further provides a device of sending multimedia information. In the embodiment, the device specifically can include a first determining unit 601 configured for determining target multimedia information in a target multimedia application, an obtaining unit 602 configured for obtaining a moving direction, a moving displacement of the mobile terminal and position coordinate of each application, a second determining unit 603 configured for determining a target application corresponding to a screen of the mobile terminal according to the moving direction, the moving displacement and position coordinates of the applications, and a trigger sending unit 604 configured for sending the target multimedia information to the target application if a predetermined condition is satisfied.

The position coordinate of each application indicates the position coordinate of each application corresponding to the mobile terminal.

Optionally, the trigger sending 604 includes a first obtaining subunit configured for obtaining a positional distance between the mobile terminal and the target application according to the moving direction, the moving displacement and the position coordinate of the target application, and a first trigger sending subunit configured for sending the multimedia information to the target application if the positional distance is shorter than the predetermined distance.

Optionally, the first obtaining subunit includes a first obtaining module configured for obtaining a current position coordinate of the mobile terminal according to the moving direction and the moving displacement, and a second obtaining module configured for obtaining the positional distance between the mobile terminal and target application according to the current position coordinate of the mobile terminal and the position coordinate of the target application.

Optionally, the trigger sending unit 604 specifically is configured for sending the multimedia information to the target application if the moving direction and the moving displacement are unchanged within a given period; or transmitting the multimedia information to the target application if the screen of the mobile terminal is touched, or transmitting the multimedia information to the target application if a pre-set button on the screen of the mobile terminal is touched/pressed.

Optionally, the obtaining unit 602 includes a second obtaining subunit configured for obtaining the moving direction by analyzing data of a gyroscope sensor when the mobile terminal moves, a third obtaining subunit configured for obtaining the moving displacement by integrating data of an acceleration sensor when the mobile terminal moves, and a fourth obtaining subunit configured for obtaining the position coordinate of each application according to a predetermined arrangement rule of each application.

The gyroscope sensor is disposed in the mobile terminal.

The acceleration sensor is disposed in the mobile terminal.

Optionally, the obtaining unit 602 further includes a fifth obtaining subunit configured for obtaining ambient images by a camera disposed in the mobile terminal when the mobile terminal moves, a sixth obtaining subunit configured for obtaining distances between each two adjacent frames of images of the ambient images, and a seventh obtaining subunit configured for adding up all the distances between each two adjacent frames of images to obtain the moving displacement.

Optionally, the device further includes an arranging unit configured for arranging each application according to the predetermined arrangement rule.

Optionally, the arranging unit is specifically configured for tiling the applications on a predetermined surface.

The predetermined surface includes at least one surface of a hexahedron with the mobile terminal as a center.

Optionally, the moving direction at least includes one of an upward movement, a downward movement, a leftward movement, a rightward movement, a forward movement and a backward movement.

Optionally, the multimedia information data include at least one of image information, video information and audio information.

According to the embodiments, the first determining unit is configured for determining target multimedia information in a target multimedia application; the obtaining unit is configured for obtaining a moving direction, a moving displacement of the mobile terminal and position coordinate of each application; the second determining unit is configured for determining a target application displayed by a screen of the mobile terminal according to the moving direction, the moving displacement and position coordinates of the applications; the trigger sending unit is configured for sending the target multimedia information to the target application if a predetermined condition is satisfied. As a result, it is unnecessary to select for multi-times and switch from the multimedia application to another application. The operation of moving the phone after selecting the target multimedia information can directly share multimedia information in the multimedia application to other applications. The entire sharing process is simple and easy. The operation of moving the phone is extremely speedy, which can result in improving the efficiency of sharing multimedia information and upgrading the user experience.

Figure 8:
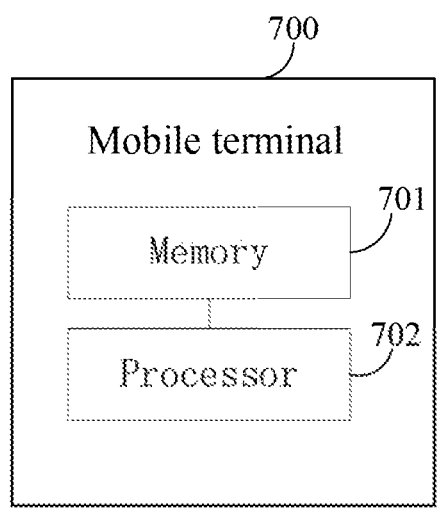
FIG. 8 is a structural view of another file transmission device provided by an embodiment of the disclosure.

The embodiment of the disclosure further provides a mobile terminal. The hardware structure of the mobile terminal can be shown as FIG. 8, including at least one memory 701 and at least one processor 702.

The memory 701 is configured for storing a program code, and the processor 702 is configured for calling the program code stored in the memory 701 to perform the file transmission method provided by the forgoing embodiments.

Moreover, the embodiment of the disclosure further provides a storage medium. The storage medium is configured for storing a program code, and the program code is configured for performing the file transmission method provided by the forgoing embodiments.

Additionally, the embodiment of the disclosure further provides a computer program product containing an instruction, run by a computer to enable the computer to perform the file transmission method provided by forgoing embodiments.

Optionally, the process of when a predetermined condition is satisfied, determining the application corresponding to the screen of the mobile terminal as a target application includes according to the moving direction and the moving displacement, determining a current position of the mobile terminal; obtaining a positional distance between the mobile terminal and the target application according to the current position of the mobile terminal and a position of the target application, and judging whether the positional distance is shorter than a predetermined distance; and if so, determining the application corresponding to the screen of the mobile terminal as the target application.

Optionally, the process of when a predetermined condition is satisfied, determining the application corresponding to the screen of the mobile terminal as a target application includes when the screen of the mobile terminal is detected to be touched, determining the application corresponding to the screen of the mobile terminal as the target application; or when a pre-set button on the screen of the mobile terminal is detected to be touched, determining the application corresponding to the screen of the mobile terminal as the target application; or when the mobile terminal is unmoved within a given period, determining the application corresponding to the screen of the mobile terminal as the target application.

Optionally, the process of obtaining a moving direction when the mobile terminal moves includes according to data sent from a gyroscope sensor disposed in the mobile terminal, obtaining the moving direction when the mobile terminal moves.

Optionally, the process of obtaining a moving displacement when the mobile terminal moves includes according to data sent from an accumulation sensor disposed in the mobile terminal, obtaining a moving acceleration and a moving time of the mobile terminal; and integrating the moving acceleration and the moving time to obtain the moving displacement.

Optionally, the process of obtaining a moving displacement when the mobile terminal moves includes obtaining ambient images by a camera disposed in the mobile terminal when the mobile terminal moves; obtaining distances between each two adjacent frames of images of the ambient images; and adding up all the distances between each two adjacent frames of images to obtain the moving displacement.

Optionally, the method further includes according to a predetermined arrangement rule, arranging the applications; and according to the predetermined arrangement rule of the applications, obtaining initial positions of the plurality of applications.

Optionally, the method further includes according to the predetermined arrangement rule, tiling the applications on a predetermined surface. The predetermined surface includes at least one surface of a hexahedron with the mobile terminal as a center.

Optionally, the moving direction at least includes one of an upward movement, a downward movement, a leftward movement, a rightward movement, a forward movement and a backward movement.

Optionally, the target data include any one of file data and multimedia information data.

Optionally, the file data include any one of a Word file, a PDF file, a TXT, an Excel file and a PPT Optionally, the multimedia information data include at least one of image information, video information and audio information.

Optionally, the process of when a predetermined condition is satisfied, determining the application corresponding to the screen of the mobile terminal as a target application includes according to the moving direction and the moving displacement, determining a current position of the mobile terminal; obtaining a positional distance between the mobile terminal and the target application according to the current position of the mobile terminal and a position of the target application, and judging whether the positional distance is shorter than a predetermined distance; and if so, determining the application corresponding to the screen of the mobile terminal as the target application.

Optionally, the process of when a predetermined condition is satisfied, determining the application corresponding to the screen of the mobile terminal as a target application includes when the screen of the mobile terminal is detected to be touched, determining the application corresponding to the screen of the mobile terminal as the target application; or when a pre-set button on the screen of the mobile terminal is detected to be touched, determining the application corresponding to the screen of the mobile terminal as the target application; or when the mobile terminal is unmoved within a given period, determining the application corresponding to the screen of the mobile terminal as the target application.

Optionally, the process of obtaining a moving direction when the mobile terminal moves includes according to data sent from a gyroscope sensor disposed in the mobile terminal, obtaining the moving direction when the mobile terminal moves.

Optionally, the process of obtaining a moving displacement when the mobile terminal moves includes according to data sent from an accumulation sensor disposed in the mobile terminal, obtaining a moving acceleration and a moving time of the mobile terminal; and integrating the moving acceleration and the moving time to obtain the moving displacement.

Optionally, the process of obtaining a moving displacement when the mobile terminal moves includes obtaining ambient images by a camera disposed in the mobile terminal when the mobile terminal moves; obtaining distances between each two adjacent frames of images of the ambient images; and adding up all the distances between each two adjacent frames of images to obtain the moving displacement.

Optionally, the method further includes according to a predetermined arrangement rule, arranging the applications; and according to the predetermined arrangement rule of the applications, obtaining initial positions of the plurality of applications.

Optionally, the method further includes according to the predetermined arrangement rule, tiling the applications on a predetermined surface. The predetermined surface includes at least one surface of a hexahedron with the mobile terminal as a center.

Optionally, the moving direction at least includes one of an upward movement, a downward movement, a leftward movement, a rightward movement, a forward movement and a backward movement.

Optionally, the target data include any one of file data and multimedia information data.

Optionally, the file data include any one of a Word file, a PDF file, a TXT, an Excel file and a PPT file.

Optionally, the multimedia information data include at least one of image information, video information and audio information.

Optionally, the process of when a predetermined condition is satisfied, transmitting the target multimedia information to the target application includes obtaining a positional distance between the mobile terminal and the target application according to the moving direction, the moving displacement and a position coordinate of the target application; if the positional distance is shorter than a predetermined distance, transferring the target multimedia information to the target application.

Optionally, the process of obtaining a positional distance between the mobile terminal and the target application according to the moving direction, the moving displacement and a position coordinate of the target application includes obtaining a current position coordinate of the mobile terminal according to the moving direction and the moving displacement, obtaining the positional distance between the mobile terminal and the target application according to the current position coordinate of the mobile terminal and a position coordinate of the target application.

Optionally, the process of when a predetermined condition is satisfied, transmitting the target multimedia information to the target application includes transmitting the multimedia information to the target application if the moving direction and the moving displacement are unchanged within a given period, or transmitting the multimedia information to the target application if the screen of the mobile terminal is touched, or transmitting the multimedia information to the target application if a pre-set button on the screen of the mobile terminal is touched/pressed.

Optionally, the process of obtaining a moving direction, a moving displacement of the mobile terminal and position coordinate of each application includes obtaining the moving direction by analyzing data of a gyroscope sensor when the mobile terminal moves, obtaining the moving displacement by integrating data of an acceleration sensor when the mobile terminal moves, and obtaining the position coordinate of each application according to a predetermined arrangement rule of each application.

The gyroscope sensor is disposed in the mobile terminal.

The acceleration sensor is disposed in the mobile terminal.

Optionally, the process of obtaining the position coordinate of each application according to a predetermined arrangement rule of each application includes obtaining ambient images by a camera disposed in the mobile terminal when the mobile terminal moves; obtaining distances between each two adjacent frames of images of the ambient images; and adding up all the distances between each two adjacent frames of images to obtain the moving displacement.

Optionally, the method further includes according to a predetermined arrangement rule, arranging the applications.

Optionally, the process of according to a predetermined arrangement rule, arranging the applications includes according to the predetermined arrangement rule, tiling the applications on a predetermined surface. The predetermined surface includes at least one surface of a hexahedron with the mobile terminal as a center.

Optionally, the moving direction at least includes one of an upward movement, a downward movement, a leftward movement, a rightward movement, a forward movement and a backward movement.

Optionally, the multimedia information data include at least one of image information, video information and audio information.

The aforementioned contents merely are preferred embodiments of the disclosure without any form of restriction to the disclosure. Although the disclosure is disclosed with preferred embodiments as above, but the disclosure is not restricted thereto. Any modification or substitution within the technical scope disclosed by the disclosure that can easily be associated by a person skilled in the art should be included in the protective scope of the disclosure. Therefore, any simply modification, equivalent alteration or decoration of the embodiments based on the technical essence of the disclosure should be included in the protective scope of the technical scheme of the disclosure.

What is claimed is:

1. A data transmission method, wherein the data transmission method is applied in a mobile terminal, the mobile terminal comprises a plurality of applications and target data, the method comprises:
    determining the target data to be transmitted from a first application among the plurality of applications to a target application among the plurality of applications;
    arranging the plurality of applications of the mobile terminal based on a predetermined arrangement rule;
    obtaining a moving direction of a movement of the mobile terminal and obtaining a moving displacement of the movement of the mobile terminal;
    determining initial positions of the plurality of applications based on the predetermined arrangement rule, wherein the initial positions of the plurality of applications are original positions of the plurality of applications relative to the mobile terminal before the movement of the mobile terminal;
    determining the target application based on the moving direction, the moving displacement and the initial positions of the plurality of applications; and
    transmitting the target data to the target application.

2. The method according to claim 1, wherein the determining the target application based on the moving direction, the moving displacement and the initial positions of the plurality of applications further comprises:
    determining a current position of the mobile terminal after the movement of the mobile terminal based on the moving direction and the moving displacement;
    determining a positional distance between the current position of the mobile terminal and an initial position of the target application; and
    determining whether the positional distance is shorter than a predetermined distance.

3. The method according to claim 1, further comprising:
    in response to detecting that a screen of the mobile terminal is touched after the movement of the mobile terminal, determining an application displayed on the screen of the mobile terminal as the target application;
    in response to detecting that a pre-set button on the screen of the mobile terminal is touched after the movement of the mobile terminal, determining the application displayed on the screen of the mobile terminal as the target application; or
    in response to determining that the mobile terminal is unmoved within a given period after the movement of the mobile terminal, determining the application displayed on the screen of the mobile terminal as the target application.

4. The method according to claim 1, wherein the obtaining a moving direction of a movement of the mobile terminal further comprises:
    according to data sent from a gyroscope sensor disposed in the mobile terminal, obtaining the moving direction of the movement of the mobile terminal.

5. The method according to claim 1, wherein the obtaining a moving displacement of the movement of the mobile terminal further comprises:
    according to data sent from an accumulation sensor disposed in the mobile terminal, obtaining a moving acceleration and a moving time of the mobile terminal; and
    integrating the moving acceleration and the moving time to obtain the moving displacement.

6. The method according to claim 1, wherein the obtaining a moving displacement of the movement of the mobile terminal further comprises:
    obtaining ambient images by a camera disposed in the mobile terminal when the mobile terminal moves;
    obtaining distances between two adjacent frames of images of the ambient images; and
    adding up all the distances between each two adjacent frames of images to obtain the moving displacement.

7. The method according to claim 1, wherein the data transmission method further comprises:
    according to the predetermined arrangement rule, tiling the plurality of applications on a predetermined surface; wherein the predetermined surface comprises at least one surface of a hexahedron with the mobile terminal as a center.

8. The method according to claim 1, wherein the moving direction at least comprises one of:
    an upward movement, a downward movement, a leftward movement, a rightward movement, a forward movement and a backward movement.

9. The method according to claim 1, wherein the target data comprise any one of:
file data and multimedia information data.

10. The method according to claim 9, wherein the file data comprise any one of:
a Word file, a PDF file, a TXT, an Excel file and a PPT file.

11. The method according to claim 9, wherein the multimedia information data comprise at least one of:
image information, video information and audio information.

12. A mobile terminal, comprising at least one memory and at least one processor;
wherein the at least one memory is configured for storing a program code, and the at least one processor is configured for calling the program code stored in the at least one memory to:
determine the target data to be transmitted from a first application among a plurality of applications to a target application among the plurality of applications, wherein the mobile terminal comprises the plurality of applications and the target data;
obtain a moving direction of a movement of the mobile terminal and obtaining a moving displacement of the movement of the mobile terminal;
determine initial positions of the plurality of applications based on the predetermined arrangement rule, wherein the initial positions of the plurality of applications are original positions of the plurality of applications relative to the mobile terminal before the movement of the mobile terminal;
determine the target application based on the moving direction, the moving displacement and the initial positions of the plurality of applications; and
transmit the target data to the target application.

13. The mobile terminal according to claim 12, wherein the at least one memory further stores instructions that upon execution by the at least one processor cause the mobile terminal to:
determine a current position of the mobile terminal after the movement of the mobile terminal based on the moving direction and the moving displacement;
determine a positional distance between the current position of the mobile terminal and an initial position of the target application; and
determine whether the positional distance is shorter than a predetermined distance.

14. The mobile terminal according to claim 12, wherein the at least one memory further stores instructions that upon execution by the at least one processor cause the mobile terminal to:
in response to detecting that a screen of the mobile terminal is touched after the movement of the mobile terminal, determine an application displayed on the screen of the mobile terminal as the target application;
in response to detecting that a pre-set button on the screen of the mobile terminal is touched after the movement of the mobile terminal, determine the application displayed on the screen of the mobile terminal as the target application; or
in response to determining that the mobile terminal is unmoved within a given period after the movement of the mobile terminal, determine the application displayed on the screen of the mobile terminal as the target application.

15. The mobile terminal according to claim 12, wherein the at least one memory further stores instructions that upon execution by the at least one processor cause the mobile terminal to:
according to data sent from an accumulation sensor disposed in the mobile terminal, obtain a moving acceleration and a moving time of the mobile terminal; and
integrate the moving acceleration and the moving time to obtain the moving displacement.

16. The mobile terminal according to claim 12, wherein the at least one memory further stores instructions that upon execution by the at least one processor cause the mobile terminal to:
obtain ambient images by a camera disposed in the mobile terminal when the mobile terminal moves;
obtain distances between two adjacent frames of images of the ambient images; and
add up all the distances between each two adjacent frames of images to obtain the moving displacement.

17. The mobile terminal according to claim 12, wherein the target data comprise any one of:
file data and multimedia information data.

18. A non-transitory storage medium, wherein the non-transitory storage medium is configured for storing a program code, and the program code is configured for performing a data transmission method, wherein the data transmission method is applied in a mobile terminal, the mobile terminal comprises a plurality of applications and target data, the method comprises:
determining the target data to be transmitted from a first application among the plurality of applications to a target application among the plurality of applications;
arranging the plurality of applications of the mobile terminal based on a predetermined arrangement rule;
obtaining a moving direction of a movement of the mobile terminal and obtaining a moving displacement of the movement of the mobile terminal;
determining initial positions of the plurality of applications based on the predetermined arrangement rule, wherein the initial positions of the plurality of applications are original positions of the plurality of applications relative to the mobile terminal before the movement of the mobile terminal;
determining the target application based on the moving direction, the moving displacement and the initial positions of the plurality of applications; and
transmitting the target data to the target application.

* * * * *